United States Patent
Jin

(10) Patent No.: US 9,387,559 B2
(45) Date of Patent: *Jul. 12, 2016

(54) AUTOMATIC SYSTEM FOR MOUNTING DOOR HINGE TO VEHICLE

(71) Applicants: Hyundai Motor Company, Seoul (KR); Kia Motors Corporation, Seoul (KR)

(72) Inventor: Taeheun Jin, Gyeongsan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 294 days.

This patent is subject to a terminal disclaimer.

(21) Appl. No.: 14/104,858

(22) Filed: Dec. 12, 2013

(65) Prior Publication Data
US 2014/0165386 A1    Jun. 19, 2014

(30) Foreign Application Priority Data
Dec. 17, 2012    (KR) ........................ 10-2012-0147790

(51) Int. Cl.
| | |
|---|---|
| *B23P 19/04* | (2006.01) |
| *B62D 65/02* | (2006.01) |
| *B62D 65/06* | (2006.01) |
| *B23P 19/10* | (2006.01) |
| *B25J 9/00* | (2006.01) |

(52) U.S. Cl.
CPC .................. *B23P 19/04* (2013.01); *B23P 19/10* (2013.01); *B25J 9/0084* (2013.01); *B62D 65/024* (2013.01); *B62D 65/06* (2013.01); *B23P 2700/50* (2013.01); *Y10T 29/53* (2015.01)

(58) Field of Classification Search
CPC ...... B23P 19/04; B23P 19/10; B23P 2700/50; B25J 9/0084; B62D 65/06; B62D 65/024; Y10T 29/53
See application file for complete search history.

(56) References Cited

U.S. PATENT DOCUMENTS

| | | | |
|---|---|---|---|
| 6,311,382 B1 * | 11/2001 | Jack ....................... | B62D 65/06 269/905 |
| 2011/0048649 A1 * | 3/2011 | Komatsu ............... | B23P 19/069 157/1.35 |

FOREIGN PATENT DOCUMENTS

| | | | | |
|---|---|---|---|---|
| JP | 2005-47453 A | | 2/2005 | |
| KR | 1019930023276 A | * | 12/1993 | ............ H05K 13/02 |
| KR | 10-0598858 B1 | | 7/2006 | |
| KR | 10-2007-0014303 A | | 2/2007 | |

\* cited by examiner

*Primary Examiner* — Moshe Wilensky
(74) *Attorney, Agent, or Firm* — Morgan, Lewis & Bockius LLP

(57) ABSTRACT

An automatic system for automatically mounting door hinges to upper and lower seats on pillars of a vehicle body conveyed by a conveying unit may include i) a first aligning unit automatically aligning a plurality of door hinges, ii) a first gripper disposed on one side of a mounting frame fixed to an arm of a first handling robot, and taking out the door hinges from the hinge box, iii) a second aligning unit loading the door hinges, and arranging the door hinges into position at a predetermined mounting angle, iv) a second gripper disposed on the other side of the mounting frame, and unloading the door hinges aligned by the second aligning unit, v) a mounting jig clamping and setting the door hinges into seats on the vehicle body, and vi) a bolt runner bolting the door hinges set in the seats on the vehicle body.

26 Claims, 14 Drawing Sheets

(a)

(b)

AUTOMATIC SYSTEM FOR MOUNTING DOOR HINGE TO VEHICLE

CROSS-REFERENCE TO RELATED APPLICATION

The present application claims priority of Korean Patent Application Number 10-2012-0147790 filed Dec. 17, 2012, the entire contents of which application is incorporated herein for all purposes by this reference.

BACKGROUND OF INVENTION

1. Field of Invention

The present invention relates to an automatic system for mounting door hinges to a vehicle. More particularly, the present invention relates to an automatic system for mounting door hinges to a vehicle which mounts door hinges in advance to the pillars of a side outer panel in a vehicle assembly line.

2. Description of Related Art

In general, the process of mounting a door to a vehicle body is implemented by mounting door hinges to the front and rear pillars of a side panel and then fastening a door to the door hinges.

The process of mounting door hinges is implemented by bringing door hinges in close contact with upper and lower seats of the front and rear pillars with a door hinge mounting jig and then bolting the door hinges to the door hinge seats, after a vehicle body is moved into position for work by a conveyor system.

The door hinge mounting jig can move forward to the side panel of the vehicle body, with the door hinges loaded, insert a tooling pin into the vehicle body, clamp the vehicle body, and move a door into position on the upper and lower door hinge seats of the front and rear pillars.

In this status, a worker manually bolts the door hinges to the door hinge seats with an electric fastening device.

However, since the process of mounting door hinges described above manually loads the door hinges on the mounting jig and then fastens the door hinges to the door hinge seats, the wages of the worker may be increased by the manual work.

Further, since the door hinges are manually fastened in the process of mounting door hinges, the worker may cause assembly variation through carelessness, which may deform a door or deteriorate the external appearance of the door.

It becomes a reason that deteriorates productivity, because the work for maintaining the product quality takes long time, including mounting again the door hinges in the following processes.

The above information disclosed in this Background section is only for enhancement of understanding of the background of the invention and therefore it may contain information that does not form the prior art that is already known in this country to a person of ordinary skill in the art.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for an automatic system for mounting door hinges to a vehicle having advantages of automatically implementing a series of processes including aligning, setting, and mounting door hinges to a vehicle body.

Various aspects of the present invention provides an automatic system for mounting door hinges to a vehicle, which is for automatically mounting door hinges to upper and lower seats on pillars of a vehicle body conveyed by a conveying unit, and may include i) a first aligning unit automatically aligning a plurality of door hinges contained in a hinge box, using vibration and the gravity, ii) a first gripper disposed on one side of a mounting frame fixed to an arm of a first handling robot, and taking out the door hinges from the hinge box of the first aligning unit, iii) a second aligning unit loading the door hinges taken out from the hinge box by the first gripper, and arranging the door hinges into position at a predetermined mounting angle, iv) a second gripper disposed on the other side of the mounting frame, and unloading the door hinges aligned by the second aligning unit, v) a mounting jig disposed outside the conveying unit, clamping the door hinges loaded by the second gripper, and setting the door hinges into seats on the vehicle body, and vi) a bolt runner fixed to an arm of the second handling robot, and bolting the door hinges set in the seats on the vehicle body.

Further, in the automatic system for mounting door hinges to a vehicle according to various aspects of the present invention, the first aligning unit may include: at least one stand frame; a tilting plate coupled to the stand frame such that the tilting plate is tilted up/down; a vibration plate seated on the top of the tilting plate and supported by the edges of the tilting plate; and a tilting cylinder vertically disposed with one side hinged to the stand frame and the other side hinged to the tilting plate.

Further, in the automatic system for mounting door hinges to a vehicle according to various aspects of the present invention, the first aligning unit may further include a vibrating mechanism disposed on the bottom of the tilting plate and vibrating the vibration plate.

Further, in the automatic system for mounting door hinges to a vehicle according to various aspects of the present invention, a plurality of support plates supporting the vibration plate may be disposed around the edges of the tilting plate.

Further, in the automatic system for mounting door hinges to a vehicle according to various aspects of the present invention, the vibrating mechanism may include: a vibration cylinder fixed to the bottom of the tilting plate and having a rack on an actuating rod reciprocating in the plane direction of the tilting plate; a rotary shaft disposed across the actuating rod and rotatably disposed on the bottom of the tilting plate; a pinion gear fixed to the rotary shaft and being in mesh with the rack on the actuating rod; and at least one hitting member fitted coaxially on the rotary shaft and applying vibration to the vibration plate through holes formed through the tilting plate.

Further, in the automatic system for mounting door hinges to a vehicle according to various aspects of the present invention, a bearing fixed by the bottom of the tilting plate may be disposed at both ends of the rotary shaft.

Further, in the automatic system for mounting door hinges to a vehicle according to various aspects of the present invention, the hitting member may be formed in a plate shape and may have hitting protrusions protruding in several directions from the center of the rotary shaft.

Further, in the automatic system for mounting door hinges to a vehicle according to various aspects of the present invention, the first aligning unit may further include a plurality of position sensors disposed on the tilting plate, movably in the alignment direction of door hinges in the hinge box, and sensing alignment positions of the door hinges.

Further, in the automatic system for mounting door hinges to a vehicle according to various aspects of the present invention, an actuating cylinder may be fixed to the tilting plate.

Further, in the automatic system for mounting door hinges to a vehicle according to various aspects of the present invention, the position sensors may be fixed to the actuating cylinder through a fixing bracket.

Further, in the automatic system for mounting door hinges to a vehicle according to various aspects of the present invention, a hinge guide supporting the door hinges may be disposed on the bottom inside the hinge box.

Further, in the automatic system for mounting door hinges to a vehicle according to various aspects of the present invention, a plurality of holding protrusions holding the door hinges may be formed in parallel on the hinge guide.

Further, in the automatic system for mounting door hinges to a vehicle according to various aspects of the present invention, seating grooves where the door hinges may be seated are formed between the holding protrusions.

Further, in the automatic system for mounting door hinges to a vehicle according to various aspects of the present invention, the hinge guide may be made of an MC nylon material.

Further, in the automatic system for mounting door hinges to a vehicle according to various aspects of the present invention, stopper blocks with a stopper groove may be disposed at the edge of the bottom of the tilting plate.

Further, in the automatic system for mounting door hinges to a vehicle according to various aspects of the present invention, stopper protrusions that are fitted into the stopper grooves of the stopper block may be disposed on the stand frame.

Further, in the automatic system for mounting door hinges to a vehicle according to various aspects of the present invention, a pair of first hinge blocks forming center points for tilting may be disposed on the bottom of the tilting plate.

Further, in the automatic system for mounting door hinges to a vehicle according to various aspects of the present invention, second hinge blocks hinged to the first hinge blocks by hinge pins are disposed on the stand frame.

Further, in the automatic system for mounting door hinges to a vehicle according to various aspects of the present invention, the stopper protrusions corresponding to the center points for tilting of the tilting plate may be inclined to limit the tilting range of the tilting plate.

Further, in the automatic system for mounting door hinges to a vehicle according to various aspects of the present invention, the first gripper may include: a first fixing frame fixed downward at an angle to one end of the mounting frame; a gripper cylinder hinged to the first fixing frame; a first clamp hinged to the end of an actuating rod of the gripper cylinder, hinged to the first fixing frame, and gripping the door hinges while being pivoted by extension and retraction of the actuating rod; and a first stopper fixed to a free end of the first fixing frame and supporting a hinge bracket of the door hinge.

Further, in the automatic system for mounting door hinges to a vehicle according to various aspects of the present invention, a first hinge holder fixing one side of the door bracket of the door hinge is disposed at the free end of the first fixing frame.

Further, in the automatic system for mounting door hinges to a vehicle according to various aspects of the present invention, a second hinge holder fixing the other side of the door bracket is disposed at the first clamp.

Further, in the automatic system for mounting door hinges to a vehicle according to various aspects of the present invention, a first holding pad and a second holing pad, which support the door bracket, are attached to the first and second hinge holders, respectively.

Further, in the automatic system for mounting door hinges to a vehicle according to various aspects of the present invention, the first stopper may be made of a urethane material.

Further, in the automatic system for mounting door hinges to a vehicle according to various aspects of the present invention, a pair of support legs supporting the hinge bracket may be formed at the first stopper.

Further, in the automatic system for mounting door hinges to a vehicle according to various aspects of the present invention, the second gripper may include: a second fixing frame vertically fixed to the other end of the mounting frame; a bidirectional cylinder fixed to a free end of the second fixing frame; second clamps fixed to both actuating rods of the bidirectional cylinder, respectively, and gripping the door bracket of the door hinge; and a second stopper disposed at the free end of the second fixing frame and supporting the door bracket.

Further, in the automatic system for mounting door hinges to a vehicle according to various aspects of the present invention, third hinge holders fixing both sides of the door bracket may be formed at the second clamp.

Further, in the automatic system for mounting door hinges to a vehicle according to various aspects of the present invention, a third holding pad supporting both sides of the door bracket may be attached to the third hinge holders.

Further, in the automatic system for mounting door hinges to a vehicle according to various aspects of the present invention, the second stopper may be made of a urethane material.

Further, in the automatic system for mounting door hinges to a vehicle according to various aspects of the present invention, the second stopper may supports the plane of the door bracket.

Further, in the automatic system for mounting door hinges to a vehicle according to various aspects of the present invention, the second aligning unit may include: a support frame; a first support part fixed to the support frame and supporting the hinge bracket of the door hinge; a pair of second support parts movably disposed at both sides from the first support part and respectively supporting both sides of the door bracket of the door hinge; an actuating cylinder fixed to the support frame and connected with the second support parts; and a hinge bracket clamper fixed to the support frame and clamping the hinge bracket by operation of the clamp cylinder.

Further, in the automatic system for mounting door hinges to a vehicle according to various aspects of the present invention, a pair of guide members that guides both sides of the hinge bracket may be included in the first support part.

Further, in the automatic system for mounting door hinges to a vehicle according to various aspects of the present invention, an approach sensor that senses whether the hinge bracket is seated may be included in the first support part.

Further, in the automatic system for mounting door hinges to a vehicle according to various aspects of the present invention, the second support part may include a pair of guide plates fixing both sides of the door bracket, facing each other at a predetermined distance to arrange the door hinge into position at a predetermined mounting angle, and fixed to the actuating rod of the actuating cylinder.

Further, in the automatic system for mounting door hinges to a vehicle according to various aspects of the present invention, the mounting jig may be disposed outside the conveying unit such that the mounting jig reciprocates on a base frame to a pillar of the vehicle body along guide rails by operation of the actuating cylinder.

Further, in the automatic system for mounting door hinges to a vehicle according to various aspects of the present invention, the mounting jig may include a vehicle body clamper clamping the vehicle body and a door hinge clamper clamping the door hinge.

Further, the automatic system for mounting door hinges to a vehicle according to various aspects of the present invention may further include a bolt feeder disposed close to the second handling robot and supplying bolts to the bolt runner.

Yet another exemplary embodiment of the present invention provides and automatic system for mounting door hinges to a vehicle, which is for automatically mounting door hinges to upper and lower seats on pillars of a vehicle body conveyed by a conveying unit and may include: aligning units automatically aligning a plurality of door hinges contained in a hinge box, using vibration and the gravity, and arranging the door hinges into position at a predetermined mounting angle; at least one gripper gripping and conveying the door hinges; and a mounting jig disposed outside the conveying unit, clamping the door hinges, and setting the door hinges into seats on the vehicle body According to exemplary embodiments of the present invention, since it is possible to automatically mount door hinges onto a vehicle body, it is possible to improve productivity and reduce the manufacturing cost, including wages of workers who work in person.

Further, since it is possible to more improve the product quality in assembly by reducing assembly variation of the door hinges through automatic mounting of the door hinges in various aspects of the present invention, it is possible to prevent deformation and deterioration of the external appearance of a door due to assembly variation and to reduce the time taken for the work of maintaining the quality and repair the product in the following processes.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The drawings are provided for reference in describing exemplary embodiments of the present invention and the spirit of the present invention should not be construed only by the accompanying drawings.

DETAILED DESCRIPTION

Figure 1:
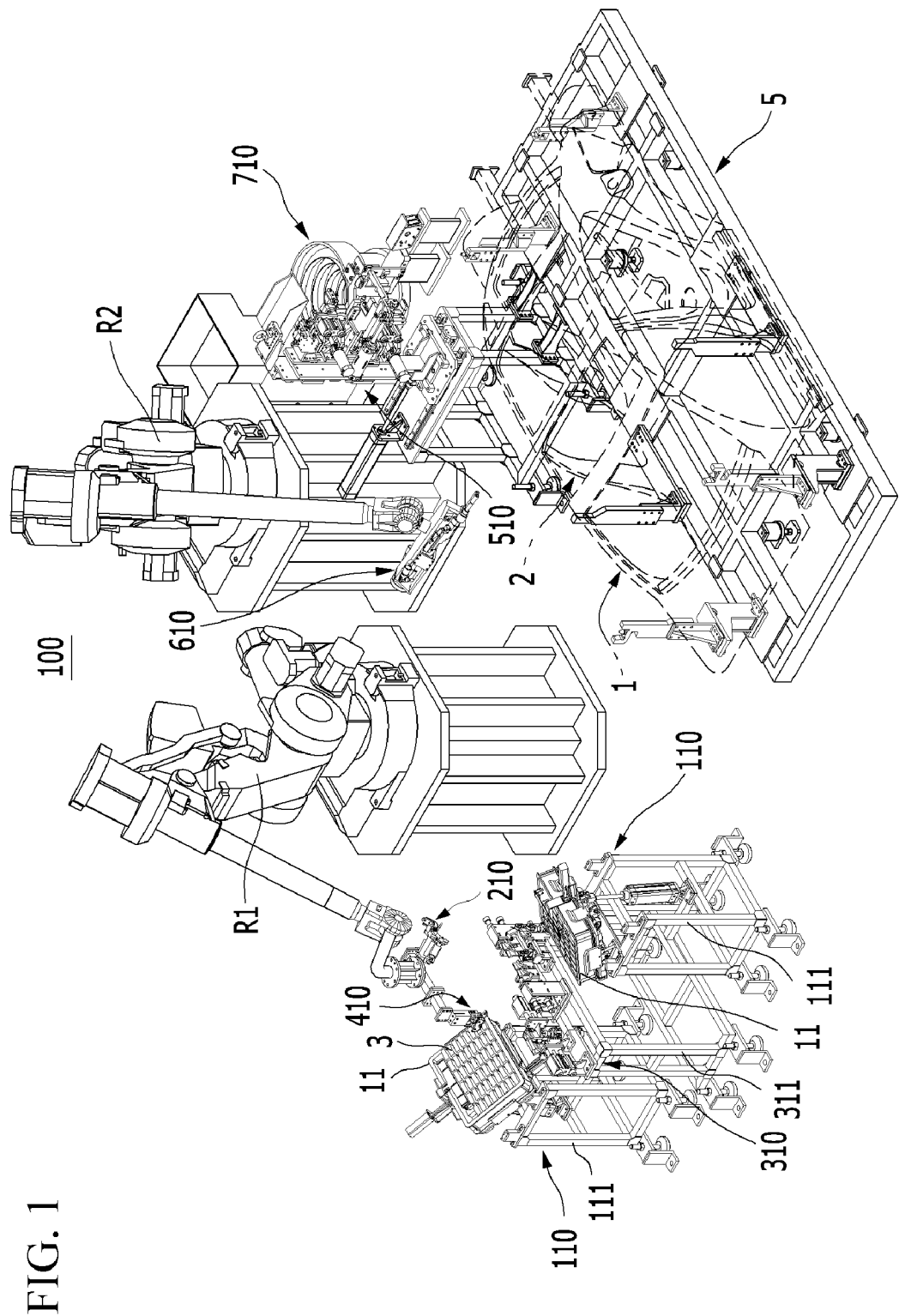
FIG. 1 is a view showing an exemplary automatic system for mounting door hinges to a vehicle according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

The unrelated parts to the description of the exemplary embodiments are not shown to make the description clear and like reference numerals designate like element throughout the specification.

Further, the sizes and thicknesses of the configurations shown in the drawings are provided selectively for the convenience of description, so that the present invention is not limited to those shown in the drawings and the thicknesses are exaggerated to make some parts and regions clear.

Discriminating the names of components with the first, the second, etc. in the following description is for discriminating them for the same relationship of the components and the components are not limited to the order in the following description.

Throughout the specification, unless explicitly described to the contrary, the word "comprise" and variations such as "comprises" or "comprising", will be understood to imply the inclusion of stated elements but not the exclusion of any other elements.

Further, the terms, " . . . unit", " . . . mechanism", " . . . portion", " . . . member" etc. used herein mean the unit of inclusive components performing at least one or more functions or operations.

FIG. 1 is a view showing an automatic system for mounting door hinges to a vehicle according to various embodiments of the present invention.

Referring to FIG. 1, an automatic system for mounting door hinges to a vehicle body according to various embodiments of the present invention may be used in a door mounting line for mounting a front door and a rear door to both side panels 2 of a vehicle body 1 in a vehicle body assembly factory.

Figure 2:
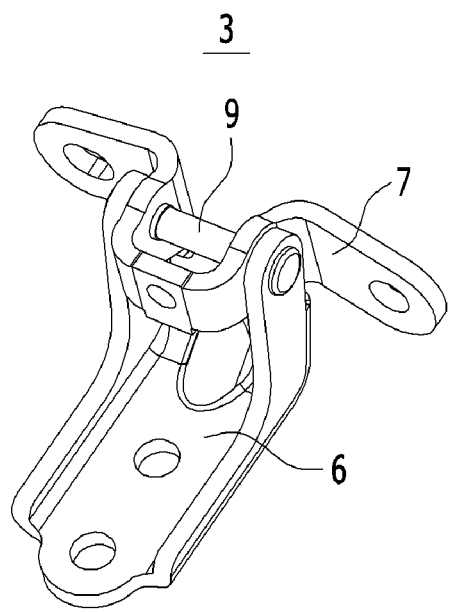
FIG. 2 is a perspective view showing examples of door hinges that are used in an exemplary automatic system for mounting door hinges to a vehicle according to the present invention.
Figure 2:
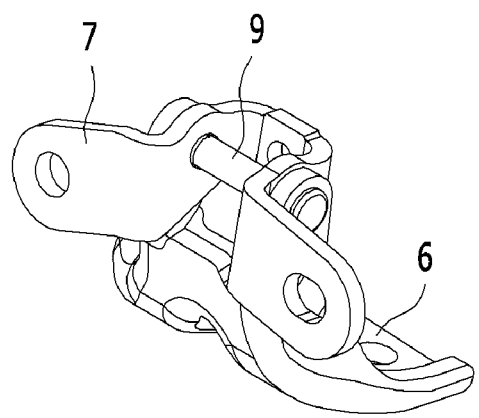

For example, the automatic system 100 for mounting door hinges to a vehicle is used to mount the door hinges 3, as in FIG. 2, in advance to the upper and lower portions of front pillars and rear pillars of the side panels 2 of the vehicle body 1.

The door hinges 3 can fall into an upper hinge shown in (a) of FIG. 2 and a lower hinge shown in (b) of FIG. 2. The upper hinges may be mounted on the upper portions of the front and rear pillars of the side panel 2 and on the upper portion of a door. The lower hinges may be mounted on the lower portions of the front and rear pillars of the side panel 2 and on the lower portion of a door.

The door hinge 3 includes a hinge bracket 6 to be mounted on the side panel 2, a door bracket 7 to be mounted on a door, and a hinge pin 9 hinging the hinge bracket 6 and the door bracket 7.

Door hinge seats where to mount the door hinges 3 are formed at the upper and lower portions of the front pillar and the rear pillar of the side panel 2. Bolt hole for bolting the door hinges 3 are formed at each of the door hinge seats.

Aligning holes for determining the reference position of the system 100 and the reference positions of the door hinges 3 are formed at the side panels 2 of the vehicle body 1.

The system 100 for mounting door hinges to a vehicle according to various embodiments of the present invention is used to automatically mount the door hinges 3 to the side panels 2 of the vehicle body 1 conveyed by a conveying unit 5.

The automatic system 100 for mounting door hinges according to various embodiments of the present invention has a structure capable of automatically and primarily aligning the door hinges 3 contained in a hinge box 11.

The conveying unit 5, which conveys the vehicle body 1, is equipped with various jigs that can fix and support the vehicle body 1.

The automatic system 100 for mounting door hinges to a vehicle according to various embodiments of the present invention has a structure capable of arranging the door hinges into position at a predetermined mounting angle in order to fix the mounting angle of the door hinges 3 between the bolting portion on the vehicle body 1 and the bolting portion on the door.

The automatic system 100 for mounting door hinges to a vehicle according to various embodiments of the present invention has a structure capable of taking out the door hinges 3 from the hinge box 11, aligning the door hinges 3, and sharing gripping (loading and unloading) of the door hinges 3 until they are mounted on the vehicle body 1.

Further, various embodiments of the present invention provide the automatic system 100 for mounting door hinges to a vehicle which can reduce assembly variation of the door hinges 3 and of which the assembly convenience and productivity can be improved in mounting the door hinges 3.

To this end, the automatic system 100 for mounting door hinges to a vehicle according to various embodiments of the present invention basically includes first aligning units 110, a first gripper 210, a second aligning unit 310, a second gripper 410, a mounting jig 510, a bolt runner 610, and a bolt feeder 710.

The door hinges 3 to be stated blow may include both of an upper hinge and a lower hinge shown in FIG. 2, and if necessary, the door hinges 3 are discriminated into upper hinges and lower hinges in the following description.

In various embodiments of the present invention, the first aligning unit 110 is provided for automatically aligning a plurality of door hinges 3 in the hinge box 11, which was stated above, using vibration and the gravity, as shown in FIG. 1.

Figure 3:
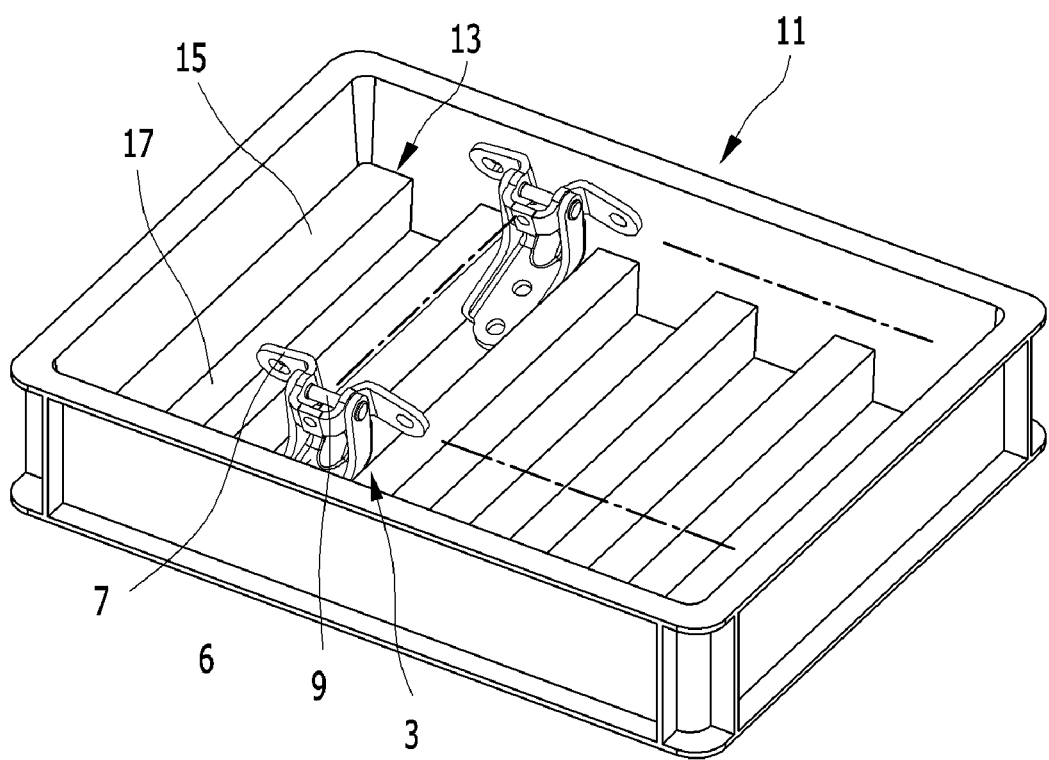
FIG. 3 is a perspective view showing an exemplary hinge box that is used in an automatic system for mounting door hinges to a vehicle according to the present invention.
Figure 4:
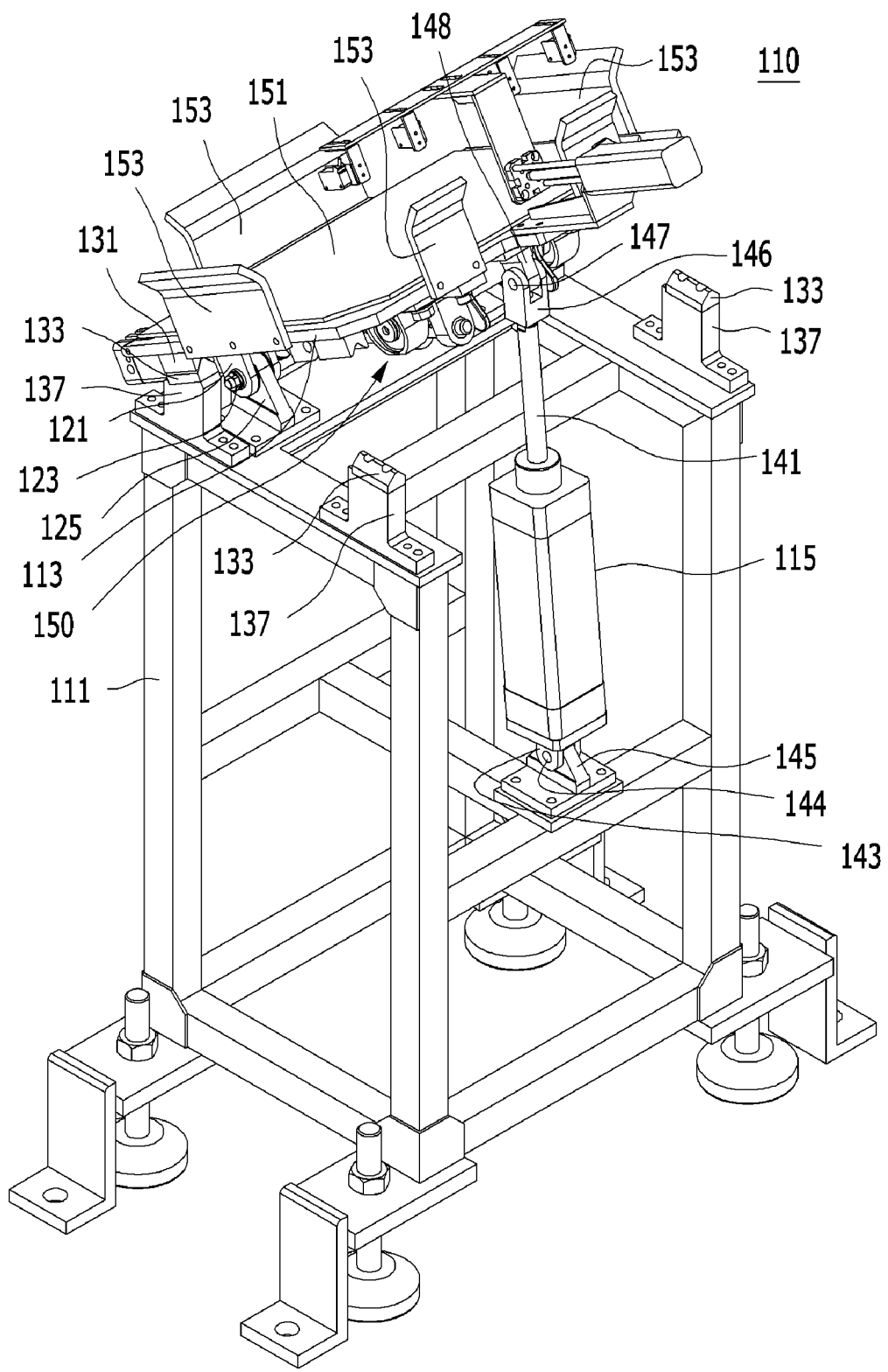
FIGS. 4 to 7 are perspective views showing a first aligning unit that is used in an exemplary automatic system for mounting door hinges to a vehicle according to the present invention.

For example, the hinge box 11 is, as shown in FIG. 3, formed in the shape of a rectangular box with the top open and the bottom closed and can contain a plurality of door hinges 3 in a plurality of lines.

Although typical upper hinges are shown in the drawings as the door hinges 3 to be contained in the hinge box 11, the hinge box 11 according to various embodiments of the present invention may contain lower hinges as the door hinges 3.

The hinge box 11 according to various embodiments of the present invention is the same in basic configuration containing lower hinges and upper hinges as the door hinges 3, such that an example containing upper hinges as the door hinges 3 in the hinge box 11 is described hereafter.

A hinge guide 13 to support the door hinges 3 is disposed on the bottom inside the hinge box 11. The hinge guide 13 seats and holds the door hinges 3 and may be made of plastic such as an MC nylon material to be advantageous in terms of weight and cost.

A plurality of holding protrusions 15 that holds the door brackets 7 of the door hinges 3 are formed in parallel at the hinge guide 13 and seating grooves 17 to seat the hinge brackets 6 of the door hinges 3 are formed between the holding protrusions 15.

Therefore, the door hinges 3 contained in the hinge box 11 can be aligned in a plurality of lines on the hinge guide 13.

FIGS. 4 to 7 are perspective views showing a first aligning unit that is used in an automatic system for mounting door hinges to a vehicle according to various embodiments of the present invention.

Referring to FIGS. 4 to 7, the first aligning unit 110 according to various embodiments of the present invention includes a stand frame 111, a tilting plate 113, and a tilting cylinder 115.

A pair of stand frames 111 may be disposed, facing each other outside the conveying unit 5, as in FIG. 1.

The stand frame 111 includes accessories such as various brackets, support blocks, plates, housing, covers, and collars for supporting various components that are described below.

However, since the accessories are provided to install the components on the stand frame 111, they are referred to as just the stand frame 111 including them, except for specific cases, in the exemplary embodiment.

The stand frame 111 supports the hinge box 11 (hereafter, see FIG. 3) with the door hinges 3 (hereafter, see FIG. 2) and also supports the following components that can tilt the hinge box 11 up and down and apply vibration to the hinge box 11.

The reason of providing the stand frames 111 in a pair facing each other is for setting a hinge box 11 containing upper hinges as the door hinges 3 on one stand frame 111 and setting a hinge box 11 containing lower hinges as the door hinges 3 on the other stand frame 111.

The tilting plate 113, which actually supports the hinge box 11, is coupled to the stand frame 111 such that it can tilt up and down. The tilting plate 113 is a substantially rectangular plate and can tilt up and down with one edge as a pivot.

To this end, a pair of hinge blocks 121 that forms the center points for tilting of the tilting plate 113 to the stand frame 111 are disposed on one edge of the bottom of the tilting plate 113. The first hinge blocks 121 may be implemented by fork-shaped brackets.

Further, a pair of second hinge blocks 125 hinged to the first hinge blocks 121 by hinge pins 123 is disposed on the top of the stand frame 111, corresponding to the first hinge blocks 121.

Stopping mechanisms that limit the tilting range of the tilting plate 113 and maintain a horizontal position of the tilting plate 113 are disposed between the edge of the bottom of the tilting plate 113 and the corresponding edge of the top of the stand frame 111.

The stopping mechanism includes a stopper block 131 disposed at the edge of the bottom of the tilting plate 113 and a stopper protrusion 133 disposed at the edge of the top of the stand frame 111 and corresponding to the stopper block 131.

The stopper block 131 has a stopper groove 131 open downward and the stopper protrusion 133 is shaped to be fitted in the stopper groove 135 of the stopper block 131. The stopper protrusion 133 may be mounted on a seating block 137 at the edge on the top of the stand frame 111.

In this case, the stopper protrusions 133 at the edge corresponding to the center points for tilting of the tilting plate 113 are arranged at an angle in the tilting direction of the tilting plate 113 to limit the tilting range of the tilting plate 113.

The tilting cylinder 115, which provides a driving force for tilting up/down the tilting plate 113, may be a pneumatic cylinder that is operated by air pressure.

The tilting cylinder 115 is vertically arranged on the stand frame 111. One side of the tilting cylinder 115 is hinged to the stand frame 111 and the other side of the tilting cylinder 115, which is an actuating rod 141, is hinged to the bottom of the tilting plate 113.

That is, the body of the tilting cylinder 115 may be coupled to a first connecting member 145 of the stand frame 111 by a first hinge member 143 and a first hinge pin 144 and the upper end of the actuating rod 141 may be hinged to a second connecting member 148 on the bottom of the tilting plate 113 by a second hinge member 146 and a second hinge pin 147.

The tilting plate 113 with the configuration described above can be tilted vertically at 30 degrees by the tilting cylinder 115 and the stopping mechanisms described above.

The first aligning unit 110 according to various embodiments of the present invention further includes a vibrating mechanism 150 that applies vibration to the hinge box 11 on the tilting plate 113.

In addition to the vibrating mechanism 150, a vibration plate 151 on which the hinge box 11 is placed and which is vibrated by vibration force from the vibrating mechanism 150 is disposed on the top of the tilting plate 113. The vibration plate 151 is simply seated on the top of the tilting plate 113 while being supported by the edges of the tilting plate 113.

To this end, support plates 153 supporting the vibration plate 151 are disposed around the edges of the tilting plate 113.

Figure 5:
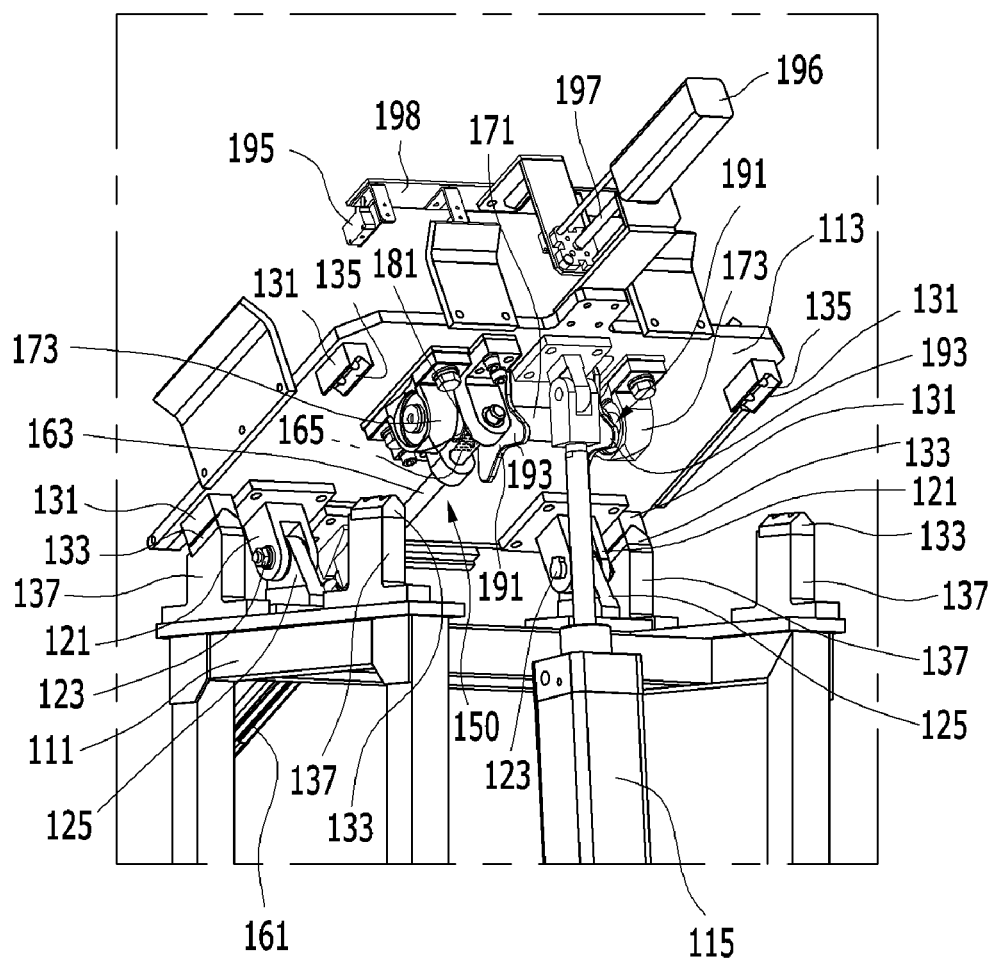
Figure 6:
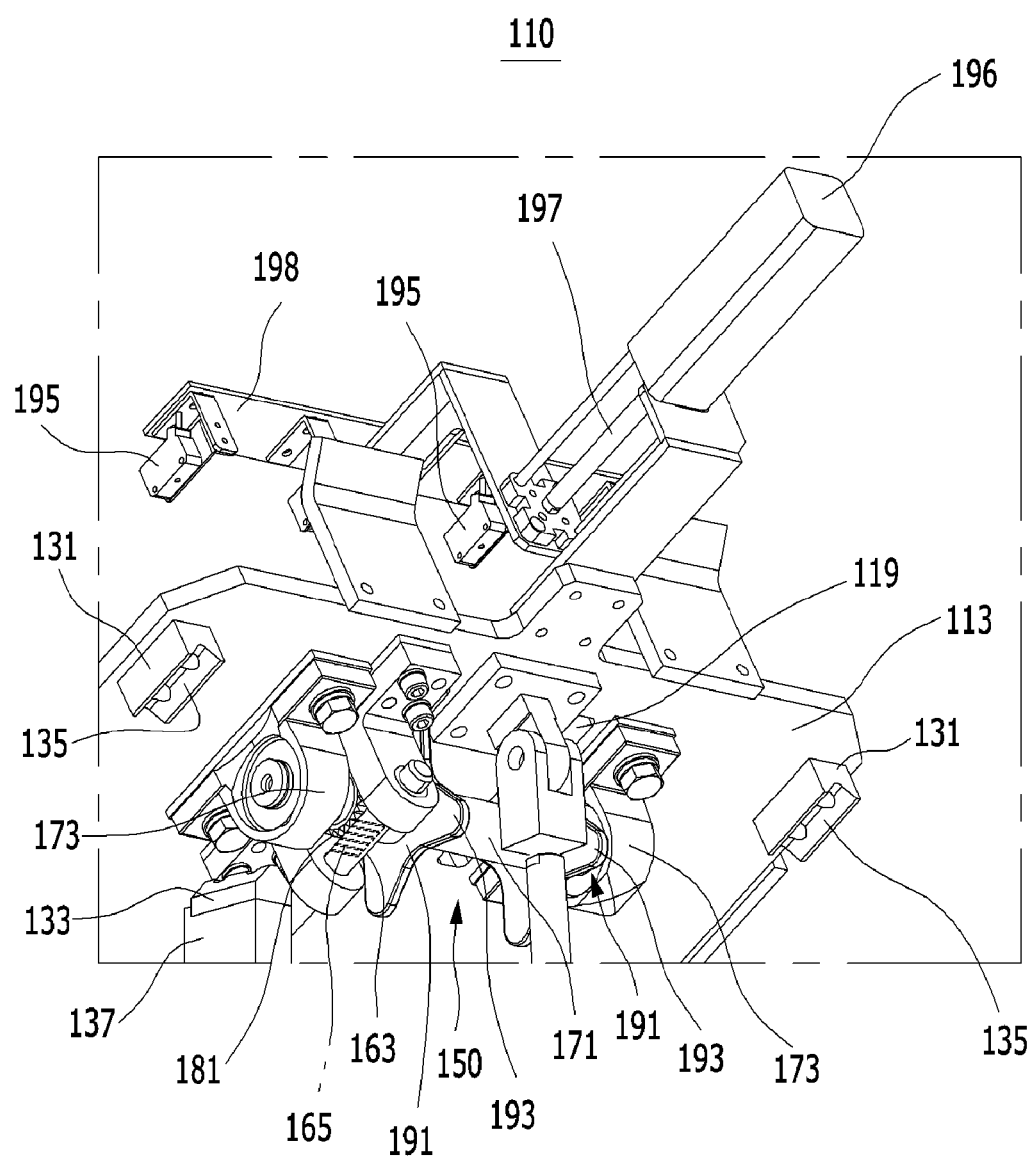
Figure 7:
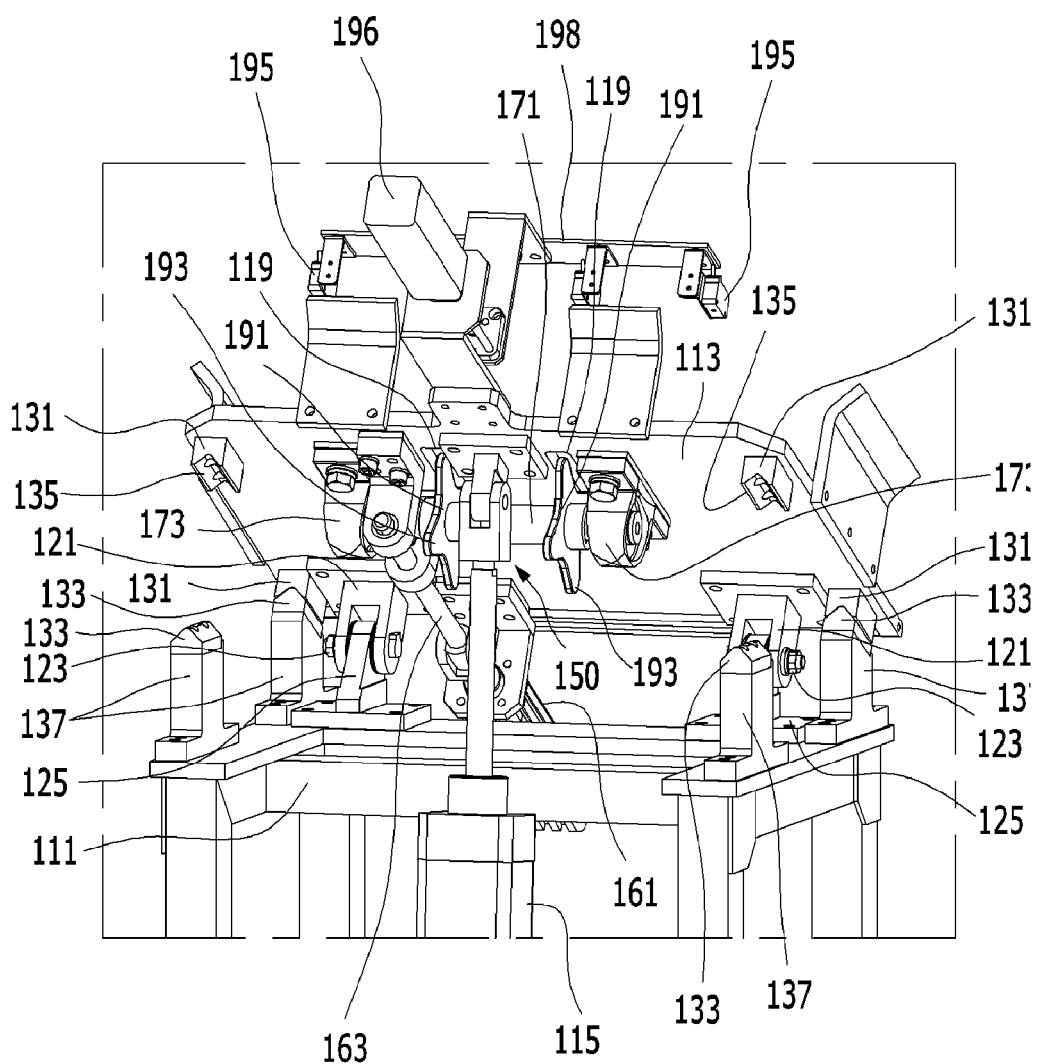

In various embodiments of the present invention, the vibrating mechanism 150, which vibrates the vibration plate 151, as in FIGS. 5 to 7, is disposed on the bottom of the tilting plate 113.

The vibrating mechanism 150 includes a vibration cylinder 161, a rotary shaft 171, a pinion gear 181, and hitting members 191.

The vibration cylinder 161, a vibration source generating vibration force, is fixed on the bottom of the tilting plate 113 and has an actuating rod 163 reciprocating in the plane direction of the tilting plate 113 (across the tilting plate). The actuating rod 163 has a rack 165 formed in a predetermined longitudinal section.

The rotary shaft 171 is disposed across the actuating rod 163 of the vibration cylinder 161, being rotatable on the bottom of the tilting plate 113. A bearing 173 fixed to the bottom of the tilting plate 113 is disposed at both ends of the rotary shaft 171.

The pinion gear 181 is fitted on the rotary shaft 171 and rotates with the rotary shaft 171. The pinion gear 181 is in mesh with the rack 165 of the actuating rod 163.

The hitting members 191, which apply vibration to the vibration plate 151 while rotating with the rotary shaft 171, are fitted coaxially on the rotary shaft 171.

The hitting members 191 are provided in a pair and formed in plate shapes. Hitting protrusions 193 protruding in several directions from the center of the rotary shaft 171 are formed at the hitting members 191. For example, the hitting members 191 may be formed in the shape of a star or a starfish.

The ends of the hitting protrusions 193 of the hitting members 191 which actually hit the vibration plate 151 may be rounded to easily hit the vibration plate 151.

In this configuration, the hitting members 191 hit the vibration plate 151 from under and through the tilting plate 113. For such an operation, a pair of holes 119 is formed through the tilting plate 113 such that the hitting protrusions 193 of the hitting member 191 protrude through them.

On the other hand, the first aligning unit 110 according to various embodiments of the present invention includes a plurality of position sensors 195 that sense the alignment positions of the door hinges 3 in the hinge box 11 and output sensing signals to a controller.

For example, the position sensors 195 may be photosensors for finding the accurate positions of the door hinges 3 of the related art.

The position sensors 195 can be moved in the alignment direction of door hinges in the hinge box 11 by an actuating cylinder 196 fixed to the tilting plate 113.

That is, the position sensors 195 may be attached to a fixing bracket 198 fixed at the end of an actuating road 197 of the actuating cylinder 196.

The position sensors 195 are moved in the alignment direction of the door hinges in the hinge box 11 by the actuating cylinder 196 and then measure the distances from the door hinges 3 aligned in the hinge box 11.

The controller supplies a control signal to a part that takes out the door hinges 3, when determining that the door hinges 3 are positioned at distances within a tolerance range on the basis of the values measured by the position sensors 195.

Figure 8:
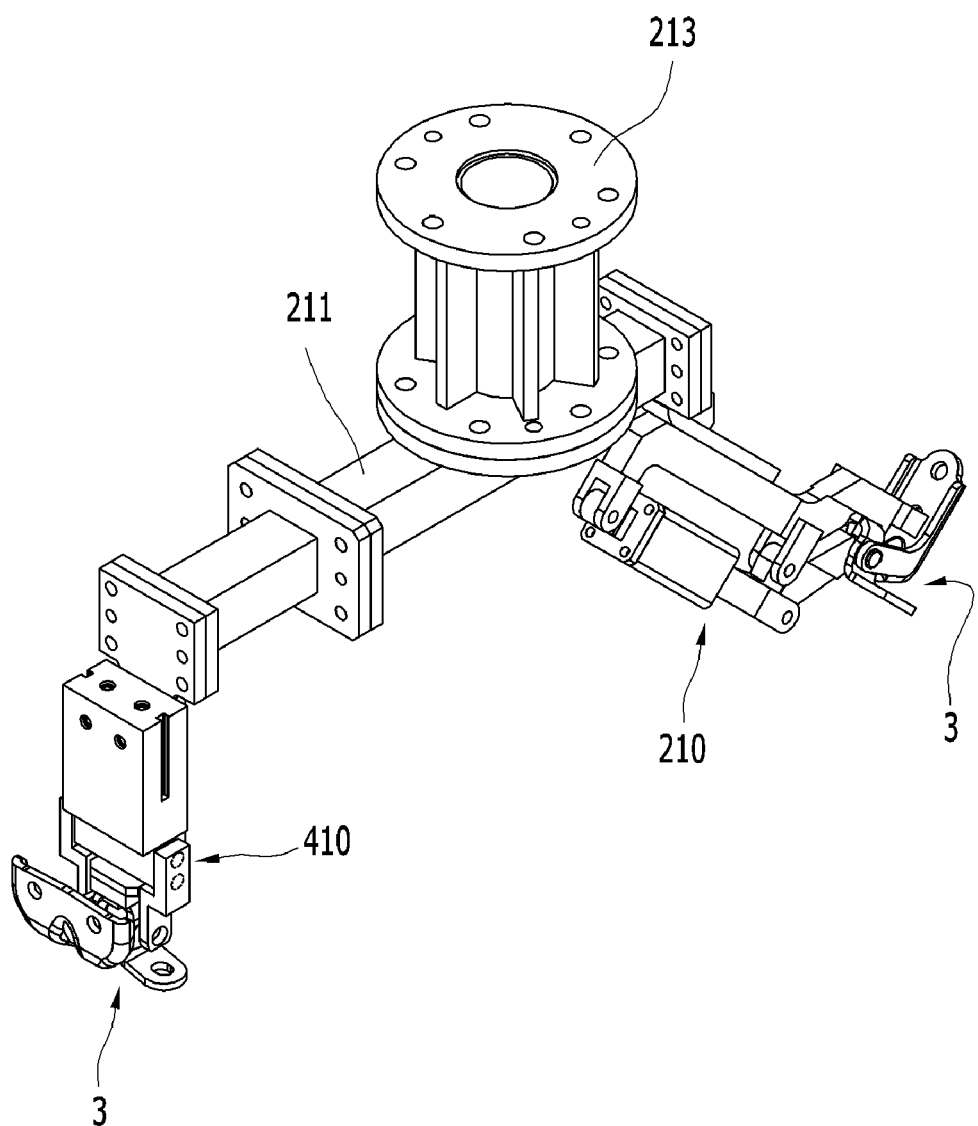
FIG. 8 is a perspective view showing first and second grippers that are used in an exemplary automatic system for mounting door hinges to a vehicle according to the present invention.

FIG. 8 is a perspective view showing first and second grippers that are used in an automatic system for mounting door hinges to a vehicle according to various embodiments of the present invention.

Referring to FIGS. 1 to 8, the first gripper 210 according to various embodiments of the present invention is provided for taking out one by one the door hinges 3 aligned in the hinge boxes 11 by the first aligning units 110 and then loading them onto the second aligning unit 310, which is described below.

The first gripper 210 may be mounted on one side of the mounting frame 211 fixed to the arm end of a first handling robot R1 (see FIG. 1). A tool changer 213 coupled to the first handling robot R1 is mounted on the mounting frame 211.

Figure 9:
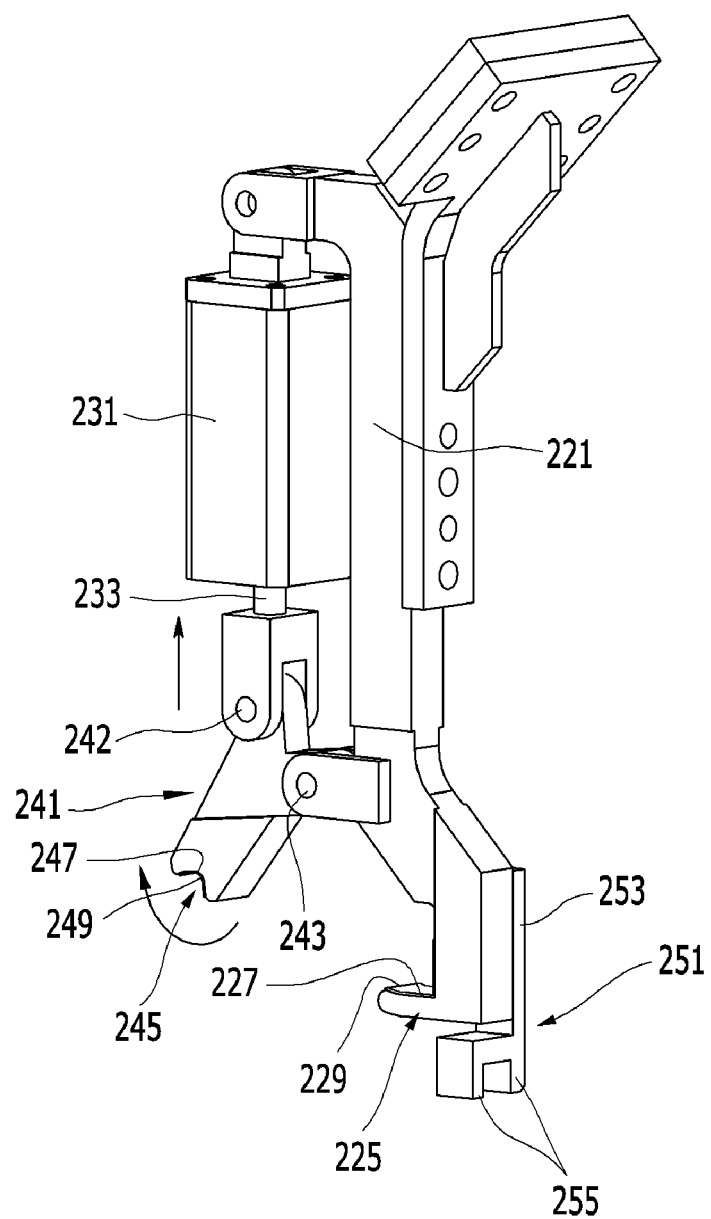
FIGS. 9 to 10 are perspective views showing a first gripper that is used in an exemplary automatic system for mounting door hinges to a vehicle according to the present invention.
Figure 10:
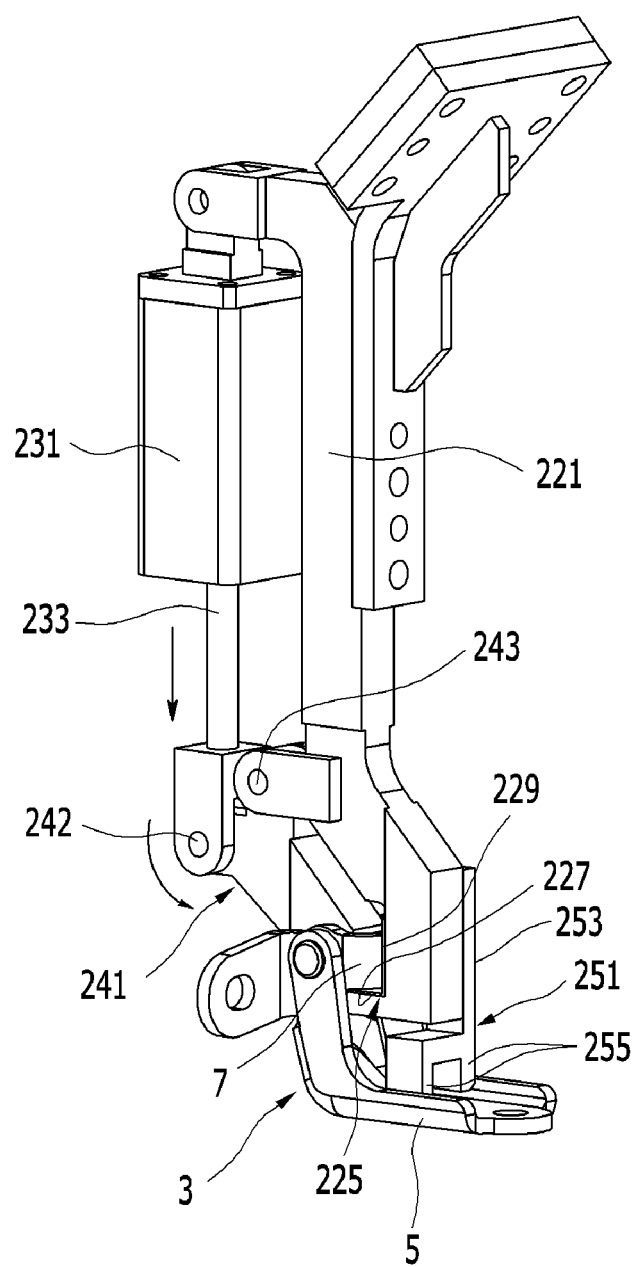

FIGS. 9 to 10 are perspective views showing a first gripper that is used in an automatic system for mounting door hinges to a vehicle according to various embodiments of the present invention.

Referring to FIGS. 8 to 10, the first gripper 210 according to various embodiments of the present invention includes a first fixing frame 221, a gripper cylinder 231, a first clamp 241, and a first stopper 251.

The first fixing frame 221 fixed at an angle downward, at one end of the mounting frame 211. Since one end of the first fixing frame 221 is fixed to the mounting frame 211, it can be defined as a fixed end and the other end of the first fixing frame 221 can be defined as a free end.

The gripper cylinder 231 is hinged to the first fixing frame 221 and the actuating rod 233 of the gripper cylinder 231 is hinged to the first clamp 241, which is described below.

The first clamp 241, which is provided for gripping the door hinges 3 aligned in the hinge box 11, is hinged to the end of the actuating rod 233 of the gripper cylinder 231 and hinged to the first fixing frame 221.

That is, the first clamp 241 can be hinged to the end of the actuating rod 233 by a first hinge pin 242 and to the fixing frame 221 by a second hinge pin 243.

Therefore, the first clamp 241 can grip the door hinges 3 while being pivoted by reciprocation of the actuating rod 233, as the gripper cylinder 231 operates.

A first hinge holder 225 that fixes one side of the door bracket 7 of a door hinge 3 is formed at the free end of the first fixing frame 221 and a second hinge holder 245 that fixes the other side of the door bracket 7 is formed at the first clamp 241.

A first clamp groove 227 that fixes one side of a door bracket 7 is formed at the first hinge holder 225 and a first holding pad 229 supporting one side of a door bracket 7 is formed at the first clamp groove 227.

Further, a second clamp groove 247 that fixes the other side of a door bracket 7 is formed at the second hinge holder 245 and a second holding pad 249 supporting the other side of a door bracket 7 is formed at the second clamp groove 247.

For example, the first and second holding pads 229 and 249 of the first and second hinge holders 225 and 245 may be made of urethane.

The first stopper 251 is provided for supporting the hinge bracket 5 of a door hinge 3 gripped by the first clamp 241, absorbing a manufacturing tolerance of the door hinge 3, and preventing rotation of the door hinge 3.

The first stopper 251 is fixed to the free end of the first fixing frame 221. The first stopper 251 may be made of urethane.

The first stopper 251 is composed of a fixed portion 253 fixed to the free end of the first fixing frame 221 and a pair of support legs 255 integrally formed with the fixed portion 253 and supporting the hinge bracket 6 of a door hinge 3. One will appreciate that the support legs may be monolithically formed with the fixed portion.

In various embodiments of the present invention, the second aligning unit 310, as shown in FIG. 1, fixes and supports the door hinges 3 taken out of the hinge box 11 by the first gripper 210 and arranges the door hinges 3 into position at a predetermined mounting angle.

That is, it is possible to arrange the door hinge 3 into position at a predetermined mounting angle in order to fix the mounting angle of the door hinge 3 between the bolting portion on the vehicle body 1 and the bolting portion on a door.

The second aligning unit 310, as shown in FIG. 1, may be disposed between the stand frames 111 of a pair of first aligning units 110. The second aligning unit 310 arranges upper hinges and lower hinges, as the door hinges 3, into position, and it is assumed that the second aligning unit 310 arranges upper hinges for the convenience in the following description.

Figure 11:
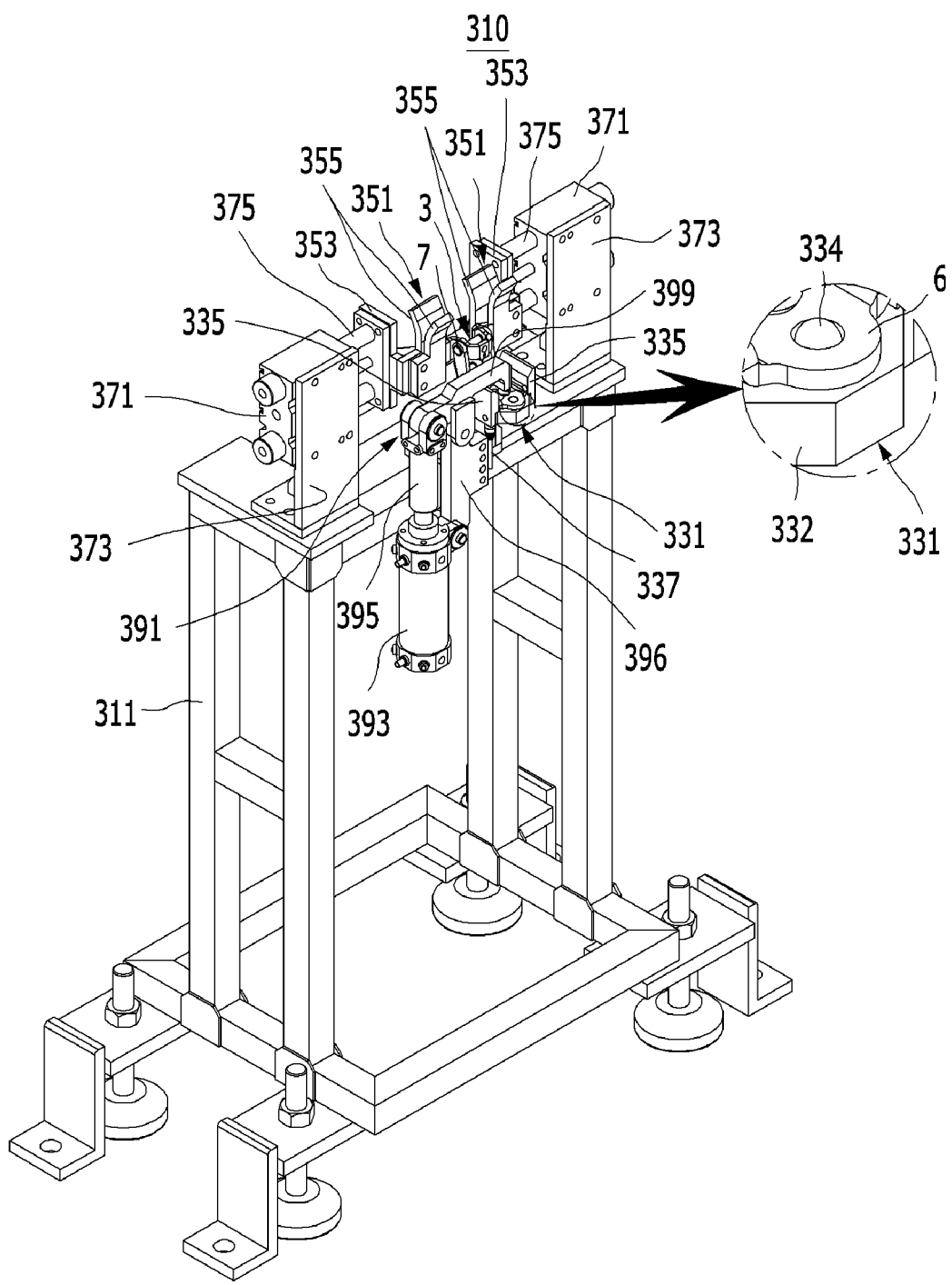
FIG. 11 is a perspective view showing a second aligning unit that is used in an exemplary automatic system for mounting door hinges to a vehicle according to the present invention.

FIG. 11 is a perspective view showing a second aligning unit that is used in an automatic system for mounting door hinges to a vehicle according to various embodiments of the present invention.

Referring to FIG. 11, the second aligning unit 310 according to various embodiments of the present invention includes a support frame 311, a first support part 331, a second support part 351, actuating cylinders 371, and a hinge bracket clamper 391.

The support frame 311, provided to support various components described below, is disposed between the pair of stand frames 111 described above. The support frame 311 includes accessories such as various brackets, support blocks, plates, housings, covers, and collars.

However, since the accessories are provided to install the components on the support frame 311, they are referred to as just the support frame 311 including them, except for specific cases, in the exemplary embodiment.

The first support part 331 supporting a hinge bracket 6 of a door hinge 3 is fixed to the support frame 311. The first support part 331 where to seat the hinge bracket 6 of the door hinge 3 may include a support bracket 332 mounted on the support frame 311.

The first support part 331 includes a pair of guide members 335 guiding both sides of the hinge bracket 6.

The guide members 335 are fixed at both sides of the seat of the support bracket 332 where the hinge bracket 6 is seated. The guide members 335 can guide the hinge bracket 6 of the door hinge 3 gripped by the first gripper 210 to the seat of the first support part 331.

At least one tooling pin 334 that positions the hinge bracket 6 with respect to the first support part 331 and aligns the hinge bracket 6 is formed at the seat of the hinge bracket 6.

The tooling pin 334 is provided in a pair in the first support part 331, and can be fitted in a bolt hole formed at the hinge bracket 6 or a specific tooling hole and align the hinge bracket 6.

Further, the first support part 331 is equipped with an approach sensor 337 that senses whether the hinge bracket 6 is seated. The approach sensor 337 senses whether there is a hinge bracket 6 seated in the seat of the first support part 331 and outputs a corresponding sensing signal to a controller.

Therefore, though not shown in the figures, it should be understood that a sensing hole for passing a sensing signal from the approach sensor 337 is formed at the seat of the first support part 331 where to seat the hinge bracket 6.

The approach sensor 337 is an approach sensor known in the art, so the configuration is not described in detail herein.

The second support parts 351 supporting both sides of the door bracket 7 of a door hinge 3 are disposed on the support frame 311. The second support parts 351 are arranged at both sides from the first support part 331 to be movable on the support frame 331.

The second support parts 351 can reciprocate closer to or away from the first support part 331.

That is, the second support parts 351 can be moved away from the first support part 331 before the hinge bracket 6 of the door hinge 3 is seated in the seat of the first support part 331 and can be moved closer to the first support part 331 after the hinge bracket 6 is seated in the seat of the first support part 331.

Before describing the configuration of the second support parts 351, the actuating cylinders 371 provided to reciprocate the second support parts 351 are fixed to the support frame 311, corresponding to the second support parts 351.

The actuating cylinders 371 are fixed to the support frame 311 by fixing brackets 373 and may be connected with the second support parts 351.

The second support parts 351 each include a pair of guide plates 355 fixed to the free end of an actuating rod 375 of the actuating cylinder 371 by a mounting bracket 353.

The pair of guide plates 355, provided to fix both sides of the door bracket 7 and arrange the door hinge 3 into position at a predetermined mounting angle, may face each other with a gap therebetween. The upper portions of the guide plates 355 may be smoothly curved away from each other.

The reason of smoothly curving the upper portions of the guide plates 355 away from each other is for easily taking out the door hinge 3 from the second support part 351, when taking out the door hinge 3 aligned by the first and second support parts 331 and 351 with the second gripper 410, which is described in detail below.

The hinge bracket clamper 391, provided to clamp the hinge bracket 6 seated in the seat of the first support part 331, is fixed to the support frame 311.

The hinge bracket clamper 391 is pivoted by actuating a clamping cylinder 393 and clamps the hinge bracket 6 of the door hinge 3. The hinge bracket clamper 391 includes a clamping member 399 that actually clamps the hinge bracket 6 of the door hinge 3.

The clamping member 399 is hinged at one end to the free end of an actuating rod 395 of the clamping cylinder 393 and hinged at the other end to a fixing block 396 fixed to the support frame 311.

On the other hand, as shown in FIG. 8, the second gripper 410 according to various embodiments of the present invention is provided to grip the door hinges 3 aligned in the second aligning unit 310, unload (take out) the door hinges 3 from the second aligning unit 310, and then load the door hinges 3 onto a mounting jig 510, which is described in detail below.

The second gripper 410 may be mounted on the other side of the mounting frame 211 fixed to the arm end of the first handling robot R1 (see FIG. 1).

Figure 12:
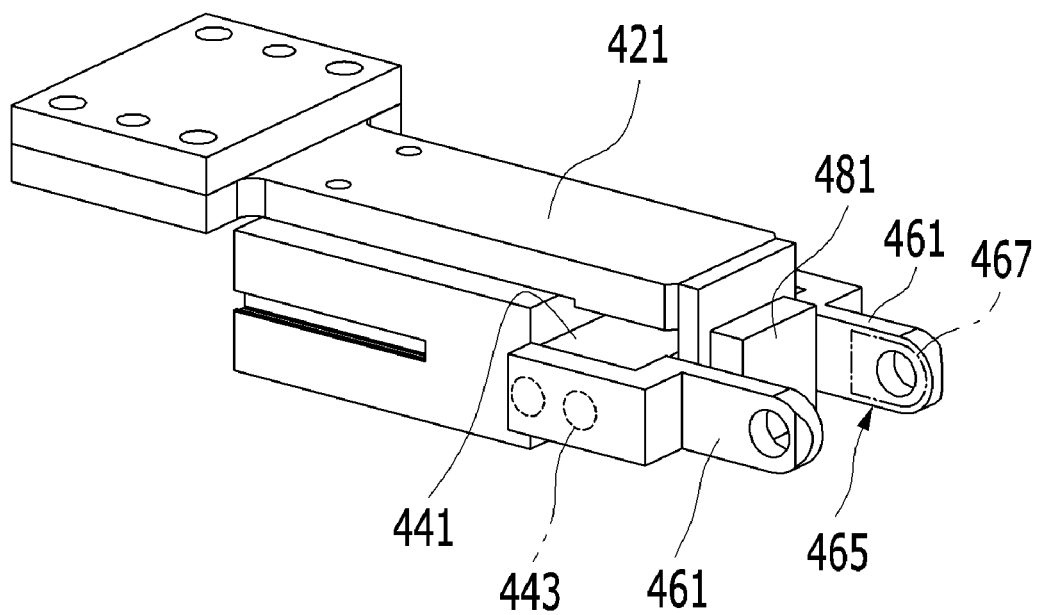
FIGS. 12 and 13 are perspective views showing a second gripper that is used in an exemplary automatic system for mounting door hinges to a vehicle according to the present invention.
Figure 13:
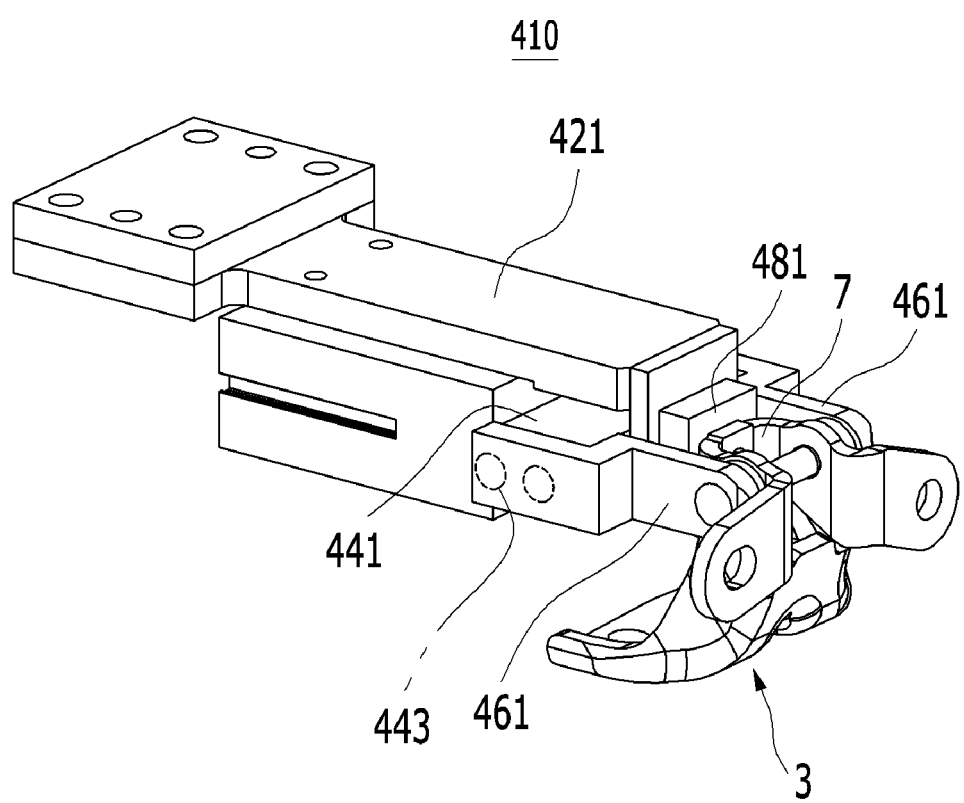

FIGS. 12 and 13 are perspective views showing a second gripper that is used in an automatic system for mounting door hinges to a vehicle according to various embodiments of the present invention.

Referring to FIGS. 12 and 13, the second gripper 410 according to various embodiments of the present invention includes a second fixing frame 421, a bidirectional cylinder 441, second clamps 461, and a second stopper 481.

The second fixing frame 421, as in FIG. 8, is vertically fixed to the other end of the mounting frame 211. Since one end of the second fixing frame 421 is fixed to the mounting frame 211, it can be defined as a fixed end and the other end of the second fixing frame 421 can be defined as a free end.

The bidirectional cylinder 441 is fixed to the free end of the second fixing frame 421. The bidirectional cylinder 441 is a bidirectional cylinder which is known in the art as a pneumatic cylinder reciprocating actuating rods 443 at both sides in both directions, so the configuration is not described in detail herein.

The second clamps 461, provided to grip the door brackets 7 of the door hinges 3 aligned in the second aligning unit 310, are fixed to both actuating rod 443 of the bidirectional cylinder 441, respectively.

Therefore, the second clamps 461 can be moved closer to the door bracket 7 of a door hinge 3 by the bidirectional cylinder 441 and can grip the door bracket 7.

Third hinge holders 465 that hold both sides of a door bracket 7 are formed at the second clamps 461, respectively. Third holding pads 467 that support both sides of a door bracket 7 are attached to the third hinge holders 465, respectively. For example, the holding pads 467 on the third hinge holders 465 may be made of a urethane material.

The second stopper 481 is provided for supporting the door bracket 7 of a door hinge 3 gripped by the second clamps 461, absorbing a manufacturing tolerance of the door hinge 3, and preventing rotation of the door hinge 3.

The second stopper 481 is fixed to the free end of the second fixing frame 421. The second stopper 481 is made of a urethane material in a rectangular plate shape and supports the plane of the door bracket 7 of a door hinge 3.

In various embodiments of the present invention, the mounting jig 510 is provided to clamp the door hinges 3 loaded by the second gripper 410 and set the door hinges 3 into the door hinge seats of the vehicle body 1, while clamping the vehicle body 1. The mounting jig 510 may be disposed outside the conveying unit 5.

Figure 14:
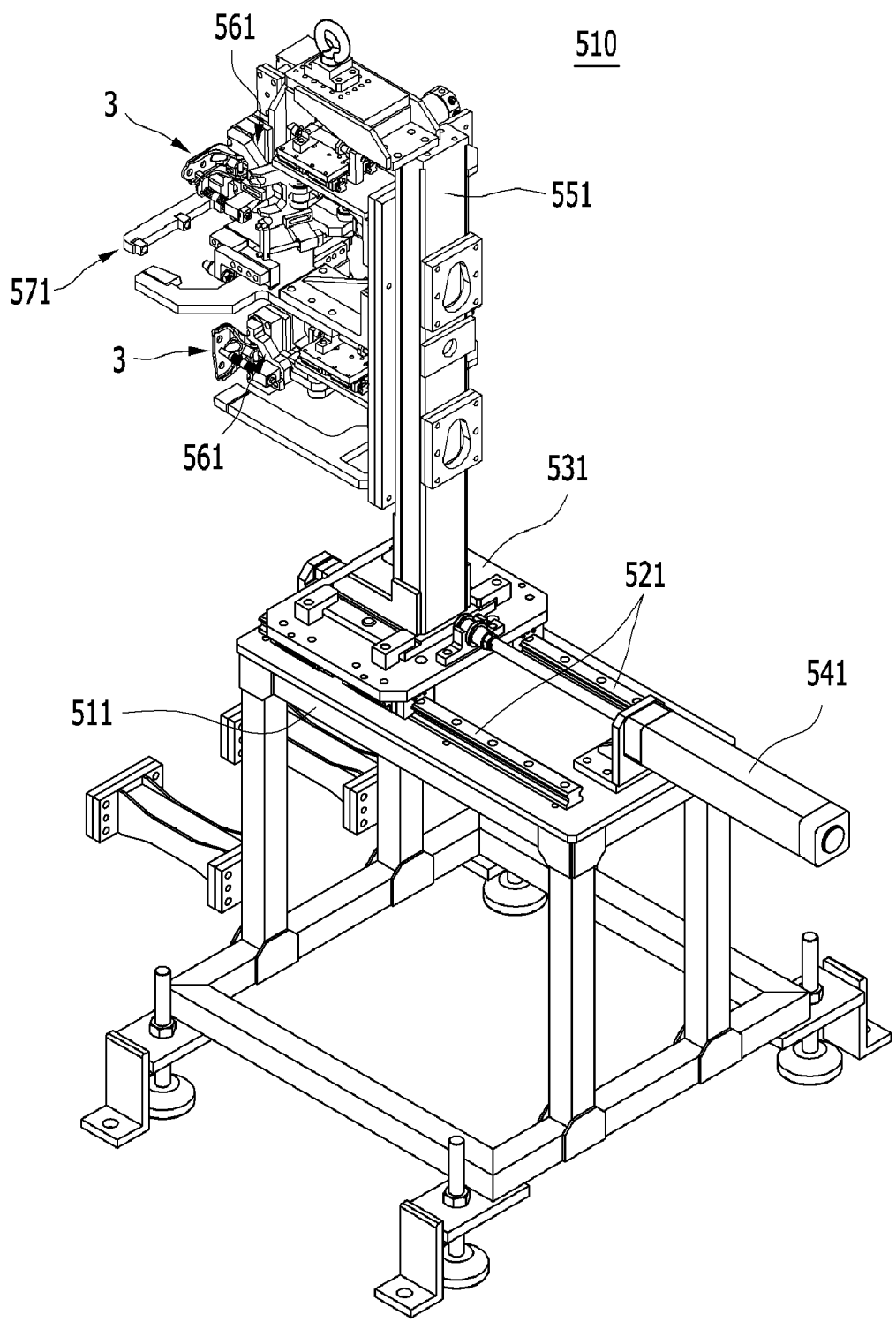
FIG. 14 is a perspective view showing a mounting jig that is used in an exemplary automatic system for mounting door hinges to a vehicle according to the present invention.

FIG. 14 is a perspective view showing a mounting jig that is used in an automatic system for mounting door hinges to a vehicle according to various embodiments of the present invention.

Referring to FIGS. 1 and 14, the mounting jig 510 according to various embodiments of the present invention may be mounted on a base frame 511, being able to reciprocate with respect to the vehicle body 1 on the conveying unit 5.

The base frame 511 includes accessories such as various brackets, support blocks, plates, housing, covers, and collars for supporting various components that are described below.

However, since the accessories are provided to install the components on the base frame 511, they are referred to as just the base frame 511 including them, except for specific cases, in the exemplary embodiment.

The mounting jig 510 may be disposed on a movable block 531 that moves along guide rails 521 on the base frame 511. The movable block 531 is slidably combined with the guide rails 521.

The movable block 531 can be reciprocated to the pillars of the vehicle body 1 along the guide rails 521 by an actuating cylinder 541 fixed to the base frame 511.

The mounting jig 510 includes a jig frame 551 vertically disposed on the movable block 531, a pair of door hinge clampers 561 mounted on the jig frame 551, and a vehicle body clamper 571 mounted, between the door hinge clampers 561, on the jig frame 551.

The door hinge clampers 561 is provided to clamp a door hinge 3 by the operation of the actuating cylinder and the vehicle body clamper 571 is provided to clamp a pillar of the vehicle body 1 by the operation of the actuating cylinder.

The door hinge clampers 561, the vehicle clamper 571, and structure for mounting the clampers 561 and 571 on the jig frame 551 are known in the art, so the configuration is not described in detail herein.

On the other hand, referring to FIG. 1, the bolt runner 610 according to various embodiments of the present invention is provided to bolt door hinges 3 set in the door hinge seats of the vehicle body 1 by the mounting jig 510. The bolt runner 610 may be fixed to the arm end of a second handling robot R2.

Further, in various embodiments of the present invention, the bolt feeder 710, provided to supply bolts to the bolt runner 610, may be disposed close to the second handling robot R2. The bolt feeder 710 has a structure that can supply bolts by moving the bolt using vibration.

The bolt runner 610 and the bolt feeder 710 are known in the art, so the configurations are not described in detail herein.

The operation and effect of the automatic system 100 for mounting door hinges to a vehicle according to various embodiments of the present invention which has the configuration described above are described hereafter in detail with reference to the drawings stated above.

The exemplary embodiment of the present invention assumes that the following operations are performed with the vehicle body 1, which has been conveyed by the conveying unit 5, in stop at a predetermined work position.

The hinge box 11 with the door hinges 3 arranged in a plurality of lines therein is loaded onto the tilting plate 113 of the first aligning unit 110, in various embodiments of the present invention.

A plurality of hinge boxes 11 are stacked at a specific place and then placed onto the tilting plates 113 on the stand frames 111 by a conveying unit not shown in the drawing but known in the art.

The tilting plates 113 are each kept horizontal by the operation of the tilting cylinder 115 and the hinge boxes 11 are each seated on the vibration plate 151 on the tilting plate 113.

The stopper protrusions 133 on the top of the stand frame 111 are in the stopper grooves 135 of the stopper blocks 131 on the bottom of the tilting plate 113. Accordingly, the tilting plate 113 keeps horizontal to the top of the stand frame 111.

In this status, the actuating rod 141 is extended by operating the tilting cylinder 115 in various embodiments of the present invention.

Accordingly, the tilting plate 113 is tilted up at a predetermined angle (for example, 30 degrees) with the hinge pins 123 of the hinged first and second hinge blocks 121 and 125, as center points for tilting.

Since the stopper protrusions 133 at the edge corresponding to the center points for tilting of the tilting plate 13 are inclined in the tilting direction of the tilting plate 113, the stopper protrusions 133 can limit the tilting range of the tilting plate 113 by being fitted into the stopper grooves 135 of the stopper blocks 131.

When the tilting plate 113 finishes tilting, as described above, the vibration cylinder 161 of the vibrating mechanism 150 reciprocates the actuating rod 163.

Accordingly, the rotary shaft 171 is rotated in both directions by the reciprocation of the actuating rod 163, because the rotary shaft 171 is rotatably disposed on the bottom of the tilting plate 113, the pinion gear 181 is fitted on the rotary shaft 171, and the pinion gear 181 is in mesh with the rack 165 of the actuating rod 163.

Accordingly, the hitting members 191 on the rotary shaft 171 rotate. The hitting members 191 rotate, with the hitting protrusions 193 protruding through the holes 119 of the tilting plate 113.

Therefore, in various embodiments of the present invention, as the hitting members 191 are rotated by the operation of the actuating cylinder 161, as described above, the hitting protrusions 193 of the hitting member 191 hit the vibration plate 151 through the holes 191, such that the vibration plate 151 with the hinge box 11 on it can be vibrated.

Therefore, since the vibration plate 151 is vibrated by the hitting members 191 of the vibrating mechanism 150, with the tilting plate 113 tilted, the door hinges 3 in the hinge box 11 can be aligned in lines along the hinge guides 13 by the vibration and the gravity.

In this process, the position sensors 195 of the first aligning unit 110 measure the distances from the door hinges 3 aligned in the hinge box 11 and output the measured values to the controller, after moved in the alignment direction of the door hinges 3 by the actuating cylinder 196.

Then, the controller supplies operation signals to the first handling robot R1 and the first gripper 210, when determining that the door hinges 3 are positioned at distances within a tolerance range on the basis of the measured values from the position sensors 195.

When an operation signal is supplied to the first handling robot R1 from the controller, the first handling robot R1 moves the first gripper 210 mounted on the mounting frame 221, inside the hinge box 11.

The first clamp 241 of the first gripper 210 has been pivoted away from the free end of the first fixing frame 221 by the retracting operation of the gripper cylinder 231.

The gripper cylinder 231 of the first gripper 210 extends the actuating rod 233, in response to an operation signal from the controller.

Accordingly, the first clamp 241 is hinged to the end of the actuating rod 233 by the first hinge pin 242 and hinged to the first fixing frame 221 by the second hinge frame 243, such that the first clamp 241 grips the door bracket 7 of a door hinge 3 while being pivoted by the extending operation of the gripper cylinder 231.

The first hinge holder 225 of the first fixing frame 221 can fix one side of the door bracket 7 with the first holding pad 229 in the first clamp groove 227.

Further, the second hinge holder 245 of the first clamp 241 can fix the other side of the door bracket 7 with the second holding pad 249 in the second clamp groove 247.

The first stopper 251 can support the door bracket 7 of a door hinge 3 gripped by the first clamp 241, absorb a manufacturing tolerance of the door hinge 3, and prevent rotation of the door hinge 3.

In this case, the stopper 251 supports the hinge bracket 6 of the door hinge 3 with the pair of support legs 255.

With the door hinge 3 gripped by the first gripper 210, as described above, the door hinge 3 is taken out from the hinge box 11 by the operation of the first handling robot R1 and moved to the second aligning unit 310 in various embodiments of the present invention.

The second support parts 351 of the second aligning unit 310 have been moved away from the first support part 331 by the retracting operation of the actuating cylinder 371.

In various embodiments of the present invention, the hinge bracket 6 of a door hinge 3 is seated on the first support part 331 of the second aligning unit 331 by the first handling robot R1, with the door hinge 3 gripped by the first gripper 210.

The hinge bracket 6 of the door hinge 3 can be easily seated in the seat of the first support part 331 while being guided by the guide member 335.

Further, the hinge bracket 6 of the door hinge 3 can be arranged into position on the first support part 331 by being fitted on the tooling pin 334 of the first support part 331.

In this process, the approach sensor 337 of the first support part 331 senses the hinge bracket 6 seated in the seat of the first support part 331 and outputs a corresponding sensing signal to the controller.

Then, the controller retracts the actuating rod 233 of the gripper cylinder 231 by supplying a control signal to the gripper cylinder 231 of the first gripper 210 in response to the sensing signal from the approach sensor 337.

Accordingly, the first clamp 241 of the first gripper 210 is pivoted and releases the door hinge 3 by the retraction of the actuating rod 233.

Thereafter, the first gripper 210 is moved back to the hinge box 11 of the first aligning unit 110 by the first handling robot R1.

With the first gripper 210 moved away and the hinge bracket 6 of the door hinge 3 in position on the first support part 331, as described above, the hinge bracket clamper 391 of the second aligning unit 310 is pivoted by the operation of the clamping cylinder 393 and clamps the hinge bracket 6.

Thereafter, in various embodiments of the present invention, the actuating rods 375 of the actuating cylinders 371 extend and move the guide plates 355 of the second support parts 351 closer to each other toward the first support part 331.

Thereafter, both sides of the door bracket 7 of the door hinge 3 enter between the guide plates 355 of the second support part 351 and the guide plates 355 fix the door bracket 7.

Therefore, in various embodiments of the present invention, it is possible to arrange a door hinge 3 into position at a predetermined mounting angle, using the first and second support parts 331 and 351 and the hinge bracket clamper 391.

That is, it is possible to arrange the door hinge 3 into position at a predetermined mounting angle in order to fix the mounting angle of the door hinge 3 between the bolting portion on the vehicle body 1 and the bolting portion on a door.

With the door hinge 3 in position by the second aligning unit 310, the second gripper 410 is moved to the second aligning unit 310 by operating the first handling robot R1 in various embodiments of the present invention.

In this operation, the second clamps 461 of the second gripper 410 have been moved away from each other by the retracting operation of the bidirectional cylinder 441.

Thereafter, the second clamps 461 are moved closer to each other by the extending operation of the bidirectional cylinder 441 with the door bracket 7 of the door hinge 3 therebetween in various embodiments of the present invention.

Therefore, the second clamps 461 can be moved closer to the door bracket 7 of a door hinge 3 by the bidirectional cylinder 441 and can grip the door bracket 7.

The third hinge holders 465 of the second clamps 461 can firmly support both sides of the door bracket 7 by means of the third holding pads 467.

The second stopper 481 can support the plane of the door bracket 7 of a door hinge 3 gripped by the second clamps 461, absorb a manufacturing tolerance of the door hinge 3, and prevent rotation of the door hinge 3.

In this process, the hinge bracket clamper 391 of the second aligning unit 310 is pivoted by the operation of the clamping cylinder 393 and unclamps the hinge bracket 6.

Thereafter, in various embodiments of the present invention, with the door bracket 7 of the door hinge 3 gripped by the second gripper 410, the door hinge 3 is taken out from the second aligning unit 310 by the operation of the first handling robot R1.

The door hinges 3 gripped by the second gripper 410 can be moved up by the first handling robot R1 and taken out from between the guide plates 355 of the second support part 351.

In the process described above, since the upper portions of the guide plates 355 are smoothly curved away from each other in various embodiments of the present invention, the door bracket 7 of the door hinge 3 can be easily taken out from the guide plates 355.

After the door hinge 3 gripped by the second gripper 410 is taken out from the second support part 351 of the second aligning unit 310, the second support part 351 returns with the retracting operation of the actuating cylinders 317.

Thereafter, the first handling robot R1 moves the door hinge 3 gripped by the second gripper 410 to the mounting jig 510.

In this operation, the mounting jig 510 has been moved back away from the vehicle body along the guide rails 521 of the base frame by the retracting operation of the actuating cylinder 541.

The first handling robot R1 positions the door hinge 3 gripped by the second gripper 410 to the door hinge clamper 561 of the mounting jig 510.

The door hinge clamper 561 clamps the door hinge 3 by the operation of the actuating cylinder.

In this process, the second gripper 410 moves back the second clamp 461 by the retracting operation of the bidirectional cylinder 441 and is moved to the second aligning unit 310 by the first handling robot R1, with the door hinge 3 released.

With the door hinge 3 loaded on the door hinge clamper 561 by the second gripper 410 and clamped by the door hinge clamp 561, as described above, the mounting jig 510 is moved to a pillar of the vehicle body 1 along the guide rails 521 by the extending operation of the actuating cylinder 541.

Thereafter, the vehicle body clamper 571 of the mounting jig 510 clamps the pillar of the vehicle body by the operation of the actuating cylinder.

Therefore, the mounting jig 510 can clamp the vehicle body 1 with the vehicle body clamper 571 while clamping the door hinge 3 with the door hinge clamper 561, and can accurately set the door hinge 3 into the door hinge seat of the vehicle body 1.

Finally, when the door hinge 3 is finished being set with respect to the vehicle body 1 by the mounting jig 510, in various embodiments of the present invention, the bolt runner 610 is moved to the position where the door hinge 3 is set, by operating the second handling robot R2 and the door hinge 3 is bolted to the door hinge seat of the vehicle body 1 by the bolt runner 610.

The bolt rubber 610 can be supplied with bolts from the bolt feeder 710.

According to the automatic system 100 for mounting door hinges to a vehicle according to various embodiments of the present invention described above, it is possible to primarily automatically align door hinges 3 contained in the hinge box 11, using the first aligning unit 110, to take out the door hinges 3 from the hinge box 11, and automatically load the door hinges 3 to the second aligning unit 310, using the first gripper 210, Further, in various embodiments of the present invention, it is possible to arrange the door hinges 3 into position at a predetermined mounting angle, using the second aligning unit 310, take out the door hinges 3 from the second aligning unit 310 and automatically load the door hinges 3 to the mounting jig 510, using the second gripper 410, and accurately set the door hinges 3 into the door hinge seats of the vehicle body 1, using the mounting jig 510.

Further, in various embodiments of the present invention, it is possible to automatically bolt the door hinges 3, which have been set on the vehicle body 1 by the mounting jig 510, to the vehicle body 1, using the bolt runner 610.

Therefore, in various embodiments of the present invention, since the door hinges 3 can be automatically mounted onto the side panel 2 of the vehicle body 1 by the various components and a series of operations described above, it is possible to improve productivity and reduce wages of workers who work in person and the manufacturing cost.

Further, in various embodiments of the present invention, since it is possible to automatically mount the door hinges 3 onto the vehicle body 1, it is possible to further improve the assembly quality by preventing assembly variation of the door hinges 3 due to manual work.

Therefore, in various embodiments of the present invention, it is possible to prevent deformation and deterioration of the external appearance of a door due to assembly variation of the door hinges 3 and to reduce the time taken for the work of maintaining the quality and repair the product in the following processes.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An automatic system for mounting door hinges to a vehicle which automatically mounts door hinges to upper and lower seats on pillars of a vehicle body conveyed by a conveying unit, the system comprising:
    a first aligning unit automatically aligning a plurality of door hinges contained in a hinge box, using vibration and gravity;
    a first gripper disposed on one side of a mounting frame fixed to an arm of a first handling robot, and taking out the door hinges from the hinge box of the first aligning unit;
    a second aligning unit loading the door hinges taken out from the hinge box by the first gripper, and arranging the door hinges into position at a predetermined mounting angle;
    a second gripper disposed on the other side of the mounting frame, and unloading the door hinges aligned by the second aligning unit;
    a mounting jig disposed outside the conveying unit, clamping the door hinges loaded by the second gripper, and setting the door hinges into seats on the vehicle body; and
    a bolt runner fixed to an arm of a second handling robot, and bolting the door hinges set in the seats on the vehicle body,
    wherein a hinge guide supporting the door hinges is disposed at a base position of the hinge box inside the hinge box.

2. The system of claim 1, wherein the first aligning unit includes:
    at least one stand frame;
    a tilting plate coupled to the stand frame such that the tilting plate is tilted up/down;
    a vibration plate seated on the top of the tilting plate and supported by the edges of the tilting plate; and
    a tilting cylinder vertically disposed with one side hinged to the stand frame and the other side hinged to the tilting plate.

3. The system of claim 2, wherein the first aligning unit further includes a vibrating mechanism disposed on an underside of the tilting plate when the plate is not yet tilted and vibrating the vibration plate.

4. The system of claim 3, wherein a plurality of support plates supporting the vibration plate is disposed around the edges of the tilting plate.

5. The system of claim 3, wherein the vibrating mechanism includes:
    a vibration cylinder fixed to the underside of the tilting plate when the plate is not yet tilted and having a rack on an actuating rod reciprocating in the plane direction of the tilting plate;
    a rotary shaft disposed across the actuating rod and rotatably disposed on the underside of the tilting plate when the plate is not yet tilted;
    a pinion gear fixed to the rotary shaft and being in mesh with the rack on the actuating rod; and
    at least one hitting member fitted coaxially on the rotary shaft and applying vibration to the vibration plate through holes formed through the tilting plate.

6. The system of claim 5, wherein the hitting member is formed in a plate shape and has hitting protrusions protruding in several directions from the center of the rotary shaft.

7. The system of claim 2, wherein the first aligning unit further includes a plurality of position sensors disposed on the tilting plate, movably in an alignment direction of door hinges in the hinge box, and sensing alignment positions of the door hinges.

8. The system of claim 7, wherein an actuating cylinder is fixed to the tilting plate and the position sensors are fixed to the actuating cylinder through a fixing bracket.

9. The system of claim 1, wherein
    a plurality of holding protrusions holding the door hinges is formed in parallel on the hinge guide, and
    seating grooves where the door hinges are seated are formed between the holding protrusions.

10. The system of claim 2, wherein
    stopper blocks with a stopper groove are disposed at the edge of an underside of the tilting plate when the plate is not yet tilted, and
    stopper protrusions that are fitted into the stopper grooves of the stopper block are disposed on the stand frame.

11. The system of claim 10, wherein
    a pair of first hinge blocks forming center points for tilting is disposed on the underside of the tilting plate when the plate is not yet tilted, and
    second hinge blocks hinged to the first hinge blocks by hinge pins are disposed on the stand frame.

12. The system of claim 11, wherein the stopper protrusions corresponding to the center points for tilting of the tilting plate are inclined to limit the tilting range of the tilting plate.

13. The system of claim 1, wherein the first gripper includes:
    a first fixing frame fixed downward at an angle to one end of the mounting frame;
    a gripper cylinder hinged to the first fixing frame;
    a first clamp hinged to the end of an actuating rod of the gripper cylinder, hinged to the first fixing frame, and gripping the door hinges while being pivoted by extension and retraction of the actuating rod; and
    a first stopper fixed to a free end of the first fixing frame and supporting a hinge bracket of the door hinge.

14. The system of claim 13, wherein
    a first hinge holder fixing one side of the door bracket of the door hinge is disposed at the free end of the first fixing frame, and
    a second hinge holder fixing the other side of the door bracket is disposed at the first clamp.

15. The system of claim 14, wherein a first holding pad and a second holing pad, which support the door bracket, are attached to the first and second hinge holders, respectively.

16. The system of claim 13, wherein the first stopper is made of a urethane material and a pair of support legs supporting the hinge bracket is formed at the first stopper.

17. An automatic system for mounting door hinges to a vehicle which automatically mounts door hinges to upper and lower seats on pillars of a vehicle body conveyed by a conveying unit, the system comprising:

a first aligning unit automatically aligning a plurality of door hinges contained in a hinge box, using vibration and gravity;

a first gripper disposed on one side of a mounting frame fixed to an arm of a first handling robot, and taking out the door hinges from the hinge box of the first aligning unit;

a second aligning unit loading the door hinges taken out from the hinge box by the first gripper, and arranging the door hinges into position at a predetermined mounting angle;

a second gripper disposed on the other side of the mounting frame, and unloading the door hinges aligned by the second aligning unit;

a mounting jig disposed outside the conveying unit, clamping the door hinges loaded by the second gripper, and setting the door hinges into seats on the vehicle body; and a bolt runner fixed to an arm of the second handling robot, and bolting the door hinges set in the seats on the vehicle body, wherein the second aligning unit includes:
- a support frame;
- a first support part fixed to the support frame and supporting the hinge bracket of the door hinge;
- a pair of second support parts movably disposed at both sides from the first support part and respectively supporting both sides of the door bracket of the door hinge;
- actuating cylinders fixed to the support frame and connected with the second support parts; and
- a hinge bracket damper fixed to the support frame and clamping the hinge bracket by operation of the clamp cylinder.

18. The system of claim 17, wherein the second gripper includes:
- a second fixing frame vertically fixed to the other end of the mounting frame;
- a bidirectional cylinder fixed to a free end of the second fixing frame;
- second clamps fixed to both actuating rods of the bidirectional cylinder, respectively, and gripping the door bracket of the door hinge; and
- a second stopper disposed at the free end of the second fixing frame and supporting the door bracket.

19. The system of claim 18, wherein third hinge holders fixing both sides of the door bracket are formed at the second clamp.

20. The system of claim 19, wherein a third holding pad supporting both sides of the door bracket is attached to the third hinge holders.

21. The system of claim 17, wherein a pair of guide members that guides both sides of the hinge bracket is included in the first support part.

22. The system of claim 17, wherein an approach sensor that senses whether the hinge bracket is seated is included in the first support part.

23. The system of claim 17, wherein the second support part includes a pair of guide plates fixing both sides of the door bracket, facing each other at a predetermined distance to arrange the door hinge into position at a predetermined mounting angle, and fixed to the actuating rod of the actuating cylinder.

24. The system of claim 17, wherein the mounting jig is disposed outside the conveying unit such that the mounting jig reciprocates on a base frame to a pillar of the vehicle body along guide rails by operation of the actuating cylinders.

25. The system of claim 24, wherein the mounting jig includes a vehicle body damper clamping the vehicle body and a door hinge damper clamping the door hinge.

26. The system of claim 17, further comprising a bolt feeder disposed adjacent to the second handling robot and supplying bolts to the bolt runner.

\* \* \* \* \*